April 21, 1964     N. A. WAAG     3,129,550
GRASS CATCHER ASSEMBLY FOR REEL-TYPE LAWN MOWERS
Filed Dec. 10, 1962     2 Sheets-Sheet 1
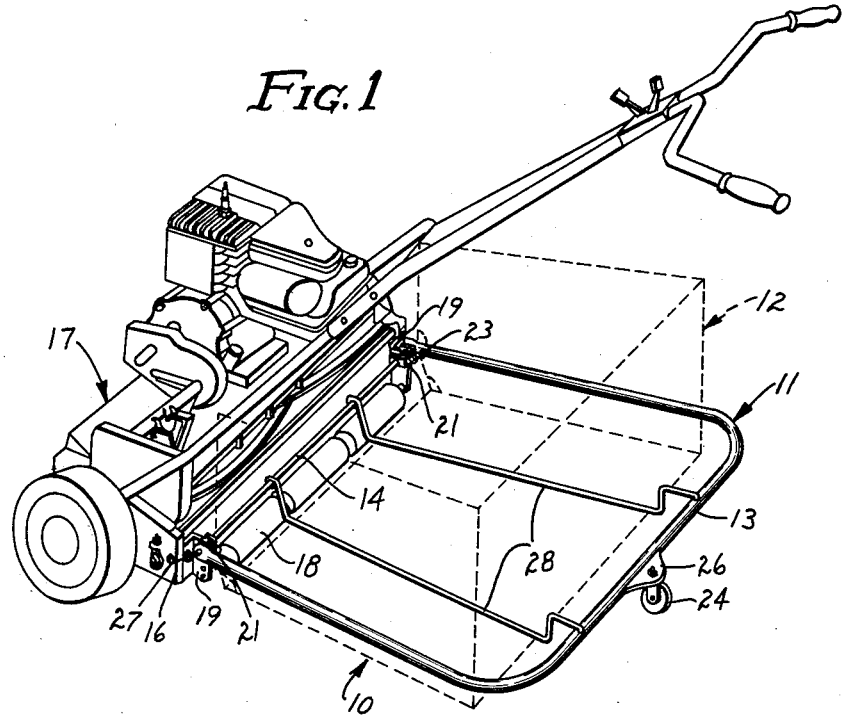
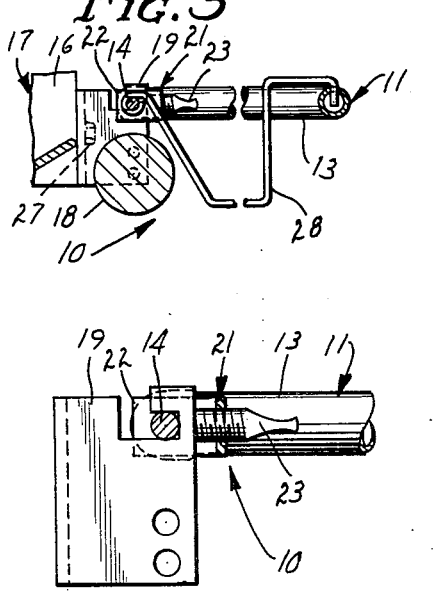
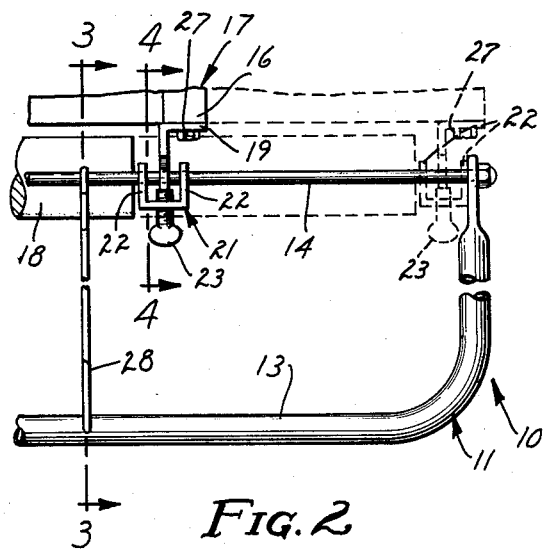
INVENTOR.
NORMAN A. WAAG
BY
Merchant, Merchant & Gould
ATTORNEYS April 21, 1964
N. A. WAAG
3,129,550
GRASS CATCHER ASSEMBLY FOR REEL-TYPE LAWN MOWERS
Filed Dec. 10, 1962
2 Sheets-Sheet 2
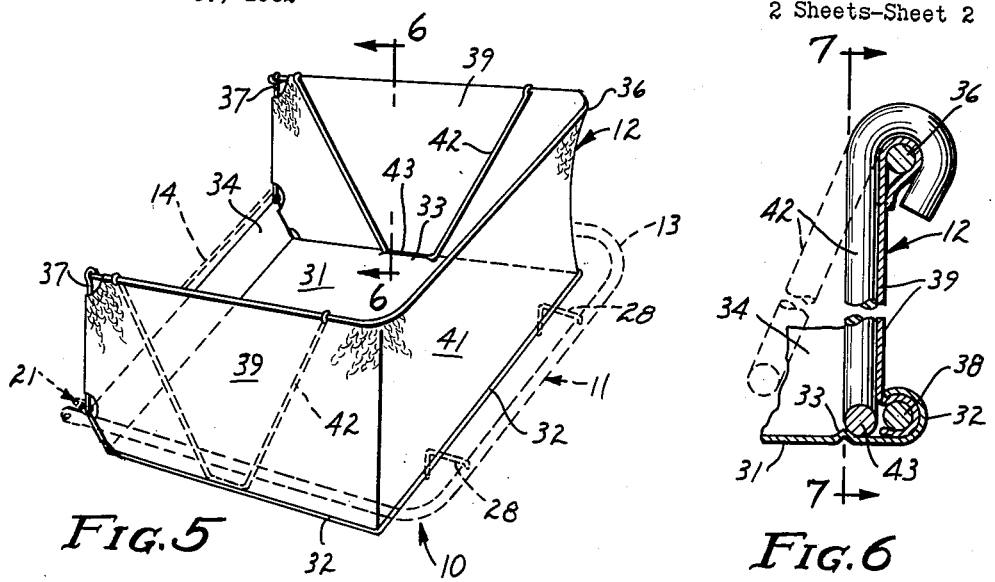
FIG.5
FIG.6
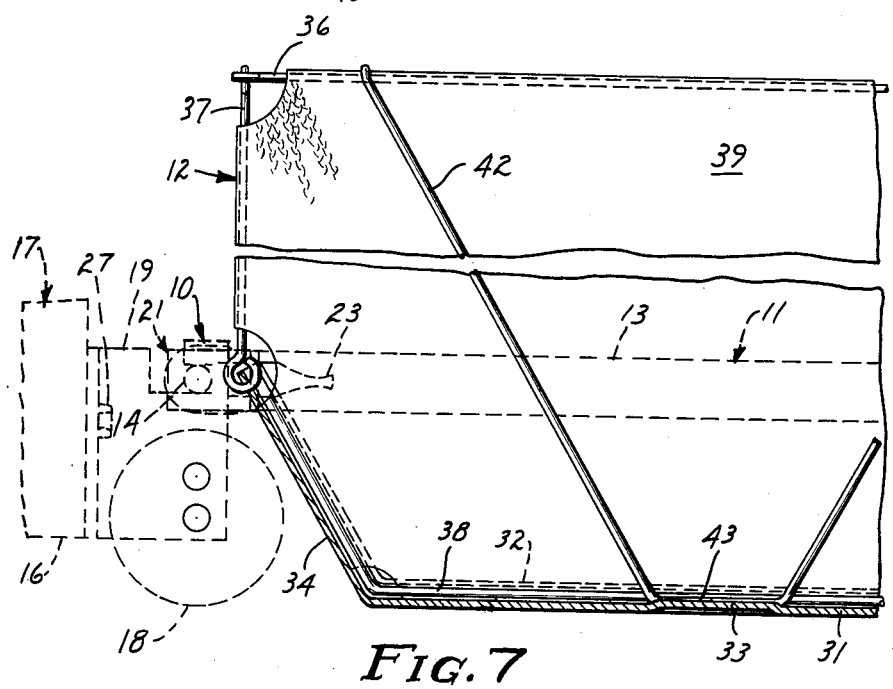
FIG.7
INVENTOR.
NORMAN A. WAAG
BY
Merchant, Merchant & Gould
ATTORNEYS United States Patent Office 3,129,550
Patented Apr. 21, 1964

3,129,550
GRASS CATCHER ASSEMBLY FOR REEL-TYPE LAWN MOWERS
Norman A. Waag, Minneapolis, Minn., assignor to J. Gordon Campbell, Incorporated, Minneapolis, Minn., a corporation of Minnesota
Filed Dec. 10, 1962, Ser. No. 243,286
10 Claims. (Cl. 56—199)

This invention relates to improvements in grass catchers.

More particularly, this invention is directed to the combination of a grass catcher frame for a reel-type lawn mower and a separate, cooperating basket therefor.

It is an object of this invention to provide a simple and very efficient grass catcher assembly composed of a grass catcher frame and a basket which coacts therewith and which is simply and easily removable from the frame as for dumping.

It is another object of this invention to provide a grass catcher assembly which has a very large capacity basket, thereby avoding the need to make frequent stops for dumping cuttings.

It is another object of this invention to provide a grass catcher of the class described wherein said basket is collapsible for storage but which is easily and simply assembled for use.

It is another object of this invention to provide a grass catcher of the class described wherein the grass catcher frame is readily attached to a reel-type lawn mower independently of the lawn mower's width.

It is another object of this invention to provide a grass catcher adapted for use with a power driven reel in a real-type lawn mower in which the grass catcher basket is separate from the frame, being merely supported by the latter, thereby permitting safe attachment and detachment of the basket as for dumping without danger of injury to the operator from revolving blades.

It is a further object of this invention to provide a grass catcher of the type described which is completely self-supporting and which does not affect mower operation by attachment thereto.

Other and further objects of this invention will become apparent to those skilled in the art from a reading of the present specification taken together with the drawings, in which:

FIG. 1 is a perspective view of a lawn mower utilizing a grass catcher assembly of the invention, the grass catcher basket being shown by dotted lines;

FIG. 2 is a top plan view of the frame used in the grass catcher assembly of FIG. 1, some parts being broken away;

FIG. 3 is a vertical sectional view taken along the line 3—3 of FIG. 2, some parts being broken away;

FIG. 4 is a vertical sectional view taken along the line 4—4 of FIG. 2, some parts being broken away;

FIG. 5 is a perspective view of the basket used in the grass catcher assembly of FIG. 1, the grass catcher frame being shown by dotted lines;

FIG. 6 is a vertical sectional view taken along the line 6—6 of FIG. 5; some parts being broken away, the movement of strut being demonstrated by dotted lines; and FIG. 7 is a sectional view taken along the line 7—7 of FIG. 6, some parts thereof being broken away and some parts being shown in section.

Turning to the drawings, there is seen in FIG. 1 a grass catcher assembly 10 comprising a grass catcher frame 11 and a separate cooperating basket 12 therefor.

Frame 11 has a horizontally disposed, generally U-shaped, frame element 13 across the ends of which is mounted a tie rod 14. Preferably, and as shown in the embodiment here depicted, the tie rod 14 is actually journalled in the ends of the U-shaped frame element 13 permitting oscillatory movements of the U-shaped frame 13 about the tie rod 14.

The tie rod 14 itself is secured to the frame 16 of a lawn mower 17 through a pair of upstanding posts 19. Most reel-type lawn mowers are so constructed with such a pair of upstanding posts 19 positioned at either end of the roller 18 of lawn mower 17. This pair of posts 19 is utilized to secure the frame 11 to the lawn mower 17. If the particular reel-type lawn mower with which the frame 11 is to be associated does not have posts 19, it is a simple matter to attach preformed sheet metal posts 19 to the frame 16 of such reel-type lawn mower at each end of the roller 18. Such sheet metal pieces would correspond generally to those shown, for example, in FIG. 4 and are usually attached to a reel-type roller frame by means of a single bolt and associated nut (not shown) such as that designated, for example, by the numeral 27 in FIG. 1.

While the actual method of fastening frame 11 to mower 17 is not critical, I prefer to employ a pair of U-shaped clamps 21, each clamp 21 having spaced arms 22 journalled on the tie rod 14 for lateral sliding movements along the tie rod 14. A screw 23, here shown with a flattened head for easy manual turning, extends axially through the base of each clamp 21. This screw 23 is adapted for extensible and retractable movements toward and away from the tie rod 14. To trail a frame 11 from a reel-type lawn mower 17, the clamps 21 are each so positioned on the tie rod 14 as to be generally symmetrically positioned (with respect to the frame 11) one opposite each post 19. The tie rod 14 is then slipped over each post 19 in such a way that the post 19 is positioned between each clamp 21 and tie rod 14. Then, each screw 23 is extended until its end is tight against each post 19. The attachment of frame 13 and tie rod 14 to mower 17 is then complete.

It is a particular feature of this invention that the frame 11 can be used with any of a variety of lawn mowers independently of their respective widths by simply choosing a frame 11 width which exceeds somewhat the width of the widest reel-type lawn mower with which the frame 11 is to be used because the clamps 21 can be slidably moved along the tie rod 14 to adapt the frame 11 for fastening to the frame 16 of a lawn mower 17 whose frame 16 has a shorter width across roller 18 than the distance between the ends of the U-shaped frame element 13. See, for example, FIG. 2 wherein the same U-shaped frame element 13 and tie rod 14 are shown connected to two mowers each having a different width, one mower being shown by solid lines and the other being shown by dotted lines.

To support the rear portion of the U-shaped frame element 13 in spaced relationship to the ground when the frame 11 is duly mounted upon a reel-type mower 17, there is provided some sort of carriage means depending from the U-shaped frame element 13. In the embodiment shown, a conventional caster 24 is centrally mounted across the rear mid-region of the U-shaped frame element 13. The leg of the caster 24 is supported by a generally horizontally rearwardly extending leaf 26 which is centrally fastened as by welding or the like to the rear of U-shaped frame element 13.

Across the U-shaped frame element 13 and cooperating therewith is provided support means forming an upwardly opening recess whose bottom portion is below the plane of the U-shaped element 13. In the embodiment shown, the support means is provided by a pair of longitudinally extending generally U-shaped support rods 28, as shown, for example, in FIG. 1. The rear end of each rod 28 mounts the rear or cross member of frame 13 (each rod 28 being spaced an equal distance from leaf 26), and the front end of each rod 28 is secured to tie rod 14 at respective positions each equally spaced inwardly from each end of tie rod 14 (so chosen that the distance between the front ends of rods 18 is generally less than the width of the narrowest reel-type lawn mower with which the frame 13 and tie rod 14 are to be used). The resulting upwardly opening recess adapts frame 13 and tie rod 14 for holding and supporting the large capacity basket 12.

The basket 12 has a generally rectangular bottom member 31 formed of thin rigid material such as sheet metal or the like. Its opposite side and rear edges define an upturned bead 32. In spaced parallel relationship to each so-beaded opposite side edge is a ridge or detent 33 defined in bottom member 31. This pair of detents 33 upwardly extend, as shown, for example, in FIG. 6. In the embodiment shown in the drawings, bottom member 31 also has an upturned lip 34 defined along its forward edge. The lateral side edges of lip 34 can also define upturned beads 32. The size of the bottom member 31 is chosen so as to permit the basket to set or nest in the recess formed or defined in the U-shaped frame 13.

Normally spaced above the opposite sides and rear edges of bottom member 31 is a generally U-shaped top frame 36. Secured to and depending from said top frame 36 are relatively flexible side and rear walls 39 and 41, respectively, which are constructed of fabric, plastic, or the like.

Each pivotally joined to and depending from a different end of said top frame is a pair of arms 37. Arms 37 and top frame 36 can be formed of heavy wire stock or the like. Arm 37, in the embodiment shown in the drawings, are connected to top frame 36 by means of interlocking eyes. The bottom or depending end of each arm 37 is pivotally joined to the underlying corner of bottom member 31. In the embodiment shown here, the lower end of each arm 37 is formed into an eye which extends through a suitable aperture formed in each underlying corner of bottom member 31 (on the opposite corners of the upturned lip 34). It will also be appreciated that the lower ends of arms 37 can be simply secured to the forward lip 34 of bottom member 31 by means of a hook and eye arrangement, wherein the eyes are formed in lips 34 and the hooks are formed in the lower ends of each arm 37.

A U-shaped bottom frame 38, constructed of a material such as that used for top frame 36 and arms 37, has dimensions which permit such bottom frame 38 to be nestingly received within the upturned beads 32 in bottom member 31. If beads 32 are formed on lip 34, frame 38 can have its ends appropriately formed for receipt within beads 32. The upturned beads 32 and bottom frame 38 cooperate to hold the bottom edges of the side and rear walls 39 and 41, respectively. It will be observed that the top edges of the side and rear walls 39 and 41, respectively, are secured to top frame 36 by simply folding the top edges of the side and rear walls 39 and 41, respectively, over top frame 36 and stitching or riveting or the like the turned-over top edge against the adjacent wall. In the embodiment shown, the side wall and rear wall 39 and 41, respectively, are integrally formed each one with the other.

Pivotally mounted for swinging movements from a top frame 36 is a pair of generally U-shaped struts 42. Each strut 42 has its ends pivotally secured to a different one of the opposite sides of top frame 36, and each strut 42 has its base region 43 adapted in its operative position to engage bottom member 31 between one of said ridges or detents 33 and the adjoining beaded side edge of bottom member 31 so as to support the top frame 36 in upwardly spaced relation to the bottom member 31 and to dispose the flexible walls 39 and 41 under tension between the frames 36 and 31.

It will be observed that in the embodiment shown the struts 42 are each secured to the top frame 36 by simply pinching the ends of each strut 42 over the combination of side wall 39 and top frame 36, due care being taken to insure that each strut is capable of swinging movements inwardly from the operative position.

It will be appreciated that the ends of a strut 42 can be secured to the top frame 36 at any point along an opposite side thereof. When the struts are swung inward and the basket 12 is collapsed, the arms 37 are disengaged from association with the bottom member 31. There is no need to remove the U-shaped bottom frame 38 from engagement with the beads 32 of bottom member 31 when collapsing the basket 12.

My invention has been thoroughly tested and found to be completely satisfactory for the accomplishment of the above objects, and while I have shown and described a preferred embodiment, I wish it to be specifically understood that the same is capable of modification without departure from the spirit and scope of the appended claims.

The claims are:
1. In a grass catcher frame for a reel-type lawn mower,
   (a) a horizontally disposed generally U-shaped frame element,
   (b) a tie rod mounted across the ends of said U-shaped element,
   (c) means for securing said tie rod to the frame of a lawn mower,
   (d) carriage means depending from said U-shaped frame element adapted to support the rear portion of said U-shaped frame element in spaced relationship to the ground,
   (e) support means extending across said U-shaped frame element and cooperating with said frame element to form an upwardly opening recess whose bottom portion is below the plane of said U-shaped element, and
   (f) a basket supported by said frame.
2. In a grass catcher frame for a reel-type lawn mower,
   (a) a horizontally disposed generally U-shaped frame element,
   (b) a tie rod mounted across the ends of said U-shaped element,
   (c) means for securing said tie rod to the frame of a lawn mower,
   (d) carriage means depending from said U-shaped frame element adapted to support the rear portion of said U-shaped frame element in spaced relationship to the ground, and
   (e) support means extending across said U-shaped frame element and cooperating with said frame element to form an upwardly opening recess whose bottom portion is below the plane of said U-shaped element.
3. A grass catcher basket comprising:
   (a) a generally rectangular bottom member of relatively rigid material defining an upturned bead along its opposite side and rear edges and further defining a pair of upwardly extending detents, each detent being in spaced, parallel relationship to an adjacent beaded opposite side edge,
   (b) a forwardly opening generally U-shaped top frame normally spaced above the opposite sides and rear edges of said bottom member,
   (c) relatively flexible side and rear walls depending from said top frame to said bottom member,
   (d) a pair of arms, each pivotally jointed to and depending from a different end of said top frame and each pivotally joined to the underlying corner of said bottom member,
   (e) a forwardly opening U-shaped bottom frame nestingly received in said upturned beads in said bottom member and cooperating with said beads to grip the bottom edges of said flexible walls, and
   (f) a pair of generally U-shaped struts, each one having its ends pivotally secured to a different one of the opposite sides of said top frame and each having its base region adapted to engage said bottom member between one of said detents and its adjacent beaded edge to support said top frame in upwardly spaced relation to said bottom member and dispose said flexible walls under tension between said frames.

4. The device of claim 3 wherein the basket has an upturned lip on its forward edge.

5. In a grass catcher frame for a reel-type lawn mower,
(a) a horizontally disposed generally U-shaped frame element,
(b) a tie rod journalled to the ends of said U-shaped frame element,
(c) a pair of U-shaped clamps, each clamp having spaced arms journalled on said tie rod for lateral sliding movements along said tie rod,
(d) screw means extending axially through the base of each of said clamps, said screw means being adapted for extensible and retractable movements toward and away from said tie rod,
(e) carriage means depending from said U-shaped frame element adapted to support the rear region of said U-shaped frame element in spaced relationship to the ground, and
(f) support means extending across said U-shaped frame element and having a bottom portion disposed nearer to the ground than said U-shaped frame element.

6. A grass catcher basket comprising:
(a) a generally rectangular bottom member of relatively rigid material defining an upturned bead along its opposite side and rear edges and further defining a pair of upwardly extending ridges, each ridge being in spaced, parallel relationship to an adjacent beaded opposite side edge,
(b) a generally U-shaped top frame normally spaced above the opposite sides and rear edges of said bottom member,
(c) relatively flexible side and rear walls depending from said top frame to said bottom member,
(d) a pair of arms, each pivotally joined to and depending from a different end of said top frame and each pivotally joined to the underlying corner of said bottom member,
(e) a U-shaped bottom frame nestingly received in said upturned beads in said bottom member and cooperating with said beads to hold the bottom edges of said flexible walls, and
(f) a pair of generally U-shaped struts, each one having its ends pivotally mounted to a different one of the opposite sides of said top frame for swinging movements from an operative position wherein the strut base region engages said bottom member between one of said detents and its adjacent beaded edge, thereby supporting said top frame in upwardly spaced relation to said bottom member and disposing said flexible walls under tension between said frames, to an inoperative position wherein such strut base region is laterally inwardly displaced from its operative position, thereby permitting said top frame and walls to collapse.

7. The device of claim 6 wherein the basket has an upturned lip on its forward edge.

8. A grass catcher frame for a reel-type lawn mower comprising:
(a) a horizontally disposed, generally U-shaped frame element,
(b) a tie rod mounted across the ends of said U-shaped element,
(c) a pair of brackets for securing said tie rod to the frame of a lawn mower, each bracket being functionally associated with a different opposite end region of said tie rod and being adapted for adjustable longitudinal sliding movements relative to said tie rod in such region,
(d) carriage means depending from said U-shaped frame element adapted to support the rear portion of said U-shaped frame element in spaced relationship to the ground,
(e) support means extending across said U-shaped frame element and cooperating with said frame element to form an upwardly opening recess whose bottom portion is below the plane of said U-shaped element, and
(f) a basket supported by said frame.

9. A grass catcher frame for a reel-type lawn mower comprising:
(a) a horizontally disposed generally U-shaped frame element,
(b) a tie rod mounted across the ends of said U-shaped element,
(c) a pair of brackets for securing said tie rod to the frame of a lawn mower, each bracket being functionally associated with a different opposite end region of said tie rod and being adapted for adjustable longitudinal sliding movements relative to said tie rod in such region,
(d) carriage means depending from said U-shaped frame element adapted to support the rear portion of said U-shaped frame element in spaced relationship to the ground, and
(e) support means extending across said U-shaped frame element and cooperating with said frame element to form an upwardly opening recess whose bottom portion is below the plane of said U-shaped element.

10. A grass catcher basket comprising:
(a) a generally rectangular bottom member of relatively rigid material defining an upturned bead along its opposite side and rear edges and further defining a pair of upwardly extending detents, each detent being in spaced, parallel relationship to an adjacent beaded opposite side edge,
(b) a forwardly opening generally U-shaped top frame normally spaced above the opposite sides and rear edges of said bottom member,
(c) relatively flexible side and rear walls depending from said top frame to said bottom member,
(d) a pair of arms adapted both to position said top frame relative to said bottom member and to maintain said side and rear walls in a generally upright position,
(e) each such arm being generally vertically positioned in the assembled basket between said top frame and said bottom member adjacent the inside face of a different one of said side members and having one end thereof pivotable with respect to the other,
(f) a forwardly opening U-shaped bottom frame nestingly received in said upturned beads in said bottom member and cooperating with said beads to grip the bottom edges of said flexible walls, and
(g) a pair of generally U-shaped struts, each one having its ends pivotally secured to a different one of the opposite sides of said top frame and each having its base region adapted to engage said bottom member between one of said detents and its adjacent beaded edge to support said top frame in upwardly spaced relation to said bottom member and dispose said flexible walls under tension between said frames.

References Cited in the file of this patent
UNITED STATES PATENTS

| | | |
|---|---|---|
| 421,370 | Kelley | Feb. 11, 1890 |
| 493,612 | Braun | Mar. 14, 1893 |
| 2,568,045 | Weisert | Sept. 18, 1951 |